(12) United States Patent
Choi et al.

(10) Patent No.: US 12,207,161 B2
(45) Date of Patent: Jan. 21, 2025

(54) IMPROVING SIDELINK POSITIONING VIA MESSAGING BETWEEN WIRELESS NODES

(71) Applicant: QUALCOMM Incorporated, San Diego, CA (US)

(72) Inventors: Chang-Sik Choi, Seoul (KR); Kapil Gulati, Belle Mead, NJ (US); Sudhir Kumar Baghel, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 18/316,729

(22) Filed: May 12, 2023

(65) Prior Publication Data

US 2023/0283991 A1 Sep. 7, 2023

Related U.S. Application Data

(62) Division of application No. 17/336,274, filed on Jun. 1, 2021, now Pat. No. 11,689,890.

(Continued)

(51) Int. Cl.
*H04W 4/02* (2018.01)
*G01S 5/02* (2010.01)
(Continued)

(52) U.S. Cl.
CPC ......... *H04W 4/029* (2018.02); *G01S 5/02216* (2020.05); *H04L 5/0048* (2013.01); *H04W 4/40* (2018.02); *H04W 56/001* (2013.01)

(58) Field of Classification Search
CPC ......... H04W 4/02; H04W 4/029; H04W 4/40; H04W 56/00; H04W 56/001; H04W 76/14; H04W 64/00; G01S 5/02216; G01S 5/0226; G01S 5/10; G01S 1/024; H04L 5/0048; H04L 5/005

See application file for complete search history.

(56) References Cited

U.S. PATENT DOCUMENTS 11,178,551 B2  11/2021  Kim et al.
11,197,264 B2  12/2021  Hunukumbure et al.
(Continued)

FOREIGN PATENT DOCUMENTS

CN  108377545 A  8/2018

OTHER PUBLICATIONS

International Search Report and Written Opinion—PCT/US2021/035456—ISA/EPO—Oct. 28, 2021.
(Continued)

*Primary Examiner* — Siu M Lee
(74) *Attorney, Agent, or Firm* — QUALCOMM Incorporated

(57) ABSTRACT

Certain aspects of the present disclosure provide techniques for improving sidelink positioning via messaging between wireless nodes, e.g., roadside service units (RSUs). A method that may be performed by a user equipment (UE) includes receiving a first positioning reference signal (PRS) from a first wireless node, receiving a second PRS from a second wireless node, receiving, from the first wireless node, an estimate of a first clock error component between the first wireless node and the second wireless node, and estimating a position of the UE, based on the first PRS, the second PRS, and the estimate of the first clock error component.

16 Claims, 11 Drawing Sheets

Related U.S. Application Data

(60) Provisional application No. 63/033,798, filed on Jun. 2, 2020.

(51) Int. Cl.
  *H04L 5/00*     (2006.01)
  *H04W 4/029*    (2018.01)
  *H04W 4/40*     (2018.01)
  *H04W 56/00*    (2009.01)

(56) References Cited

U.S. PATENT DOCUMENTS

| | | | |
|---|---|---|---|
| 11,689,890 B2 * | 6/2023 | Choi | H04W 4/029 455/456.1 |
| 2018/0139763 A1 * | 5/2018 | Bitra | H04W 72/542 |
| 2019/0044677 A1 | 2/2019 | Ly | |
| 2021/0112521 A1 * | 4/2021 | Dwivedi | H04W 64/00 |
| 2021/0377699 A1 | 12/2021 | Choi et al. | |

OTHER PUBLICATIONS

Partial International Search Report—PCT/US2021/035456—ISA/EPO—Sep. 7, 2021.
ZTE: "RSU Enhancement", 3GPP TSG-RAN WG1 Meeting #84bis, 3GPP Draft, R1-162421 RSU Enhancement, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11, 2016-Apr. 15, 2016, 4 Pages Apr. 1, 2016 (Apr. 1, 2016), XP051079570, figure 1.

* cited by examiner

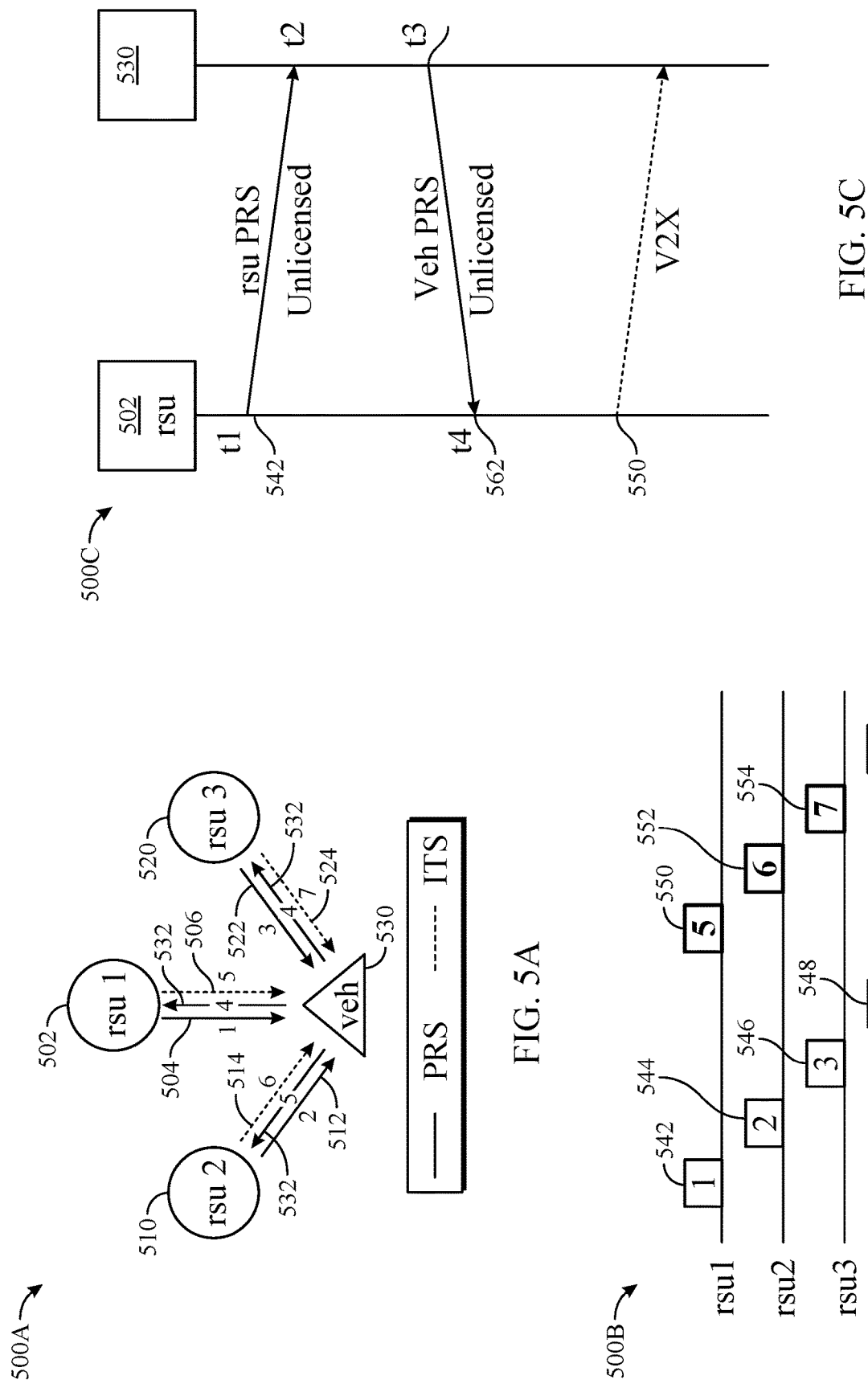

IMPROVING SIDELINK POSITIONING VIA MESSAGING BETWEEN WIRELESS NODES

CROSS-REFERENCE TO RELATED APPLICATION(S)

This application is a divisional of U.S. application Ser. No. 17/336,274, filed Jun. 1, 2021, which claims benefit of and priority to U.S. Provisional Application No. 63/033,798, entitled "Sidelink Positioning Via Messaging Between Roadside Service Units," filed Jun. 2, 2020, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for improving sidelink positioning accuracy using messaging between wireless nodes, e.g., roadside service units (RSUs), to supply information regarding clock error components.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3 GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Some features will now be discussed briefly. After considering this discussion, and particularly after reading the section entitled "Detailed Description" one will understand how the features of this disclosure provide advantages that include improved accuracy in positioning of user equipments (UEs) (e.g., UEs in vehicles).

Certain aspects of the subject matter described in this disclosure can be implemented in a method for wireless communications performed by a UE. The method generally includes receiving a first positioning reference signal (PRS) from a first wireless node; receiving a second PRS from a second wireless node; receiving, from the first wireless node, an estimate of a first clock error component between the first wireless node and the second wireless node; and estimating a position of the UE, based on the first PRS, the second PRS, and the estimate of the first clock error component.

Certain aspects of the subject matter described in this disclosure can be implemented in a method for wireless communications performed by a first wireless node. The method generally includes transmitting a first PRS at a first time; receiving a second PRS from a second wireless node at a second time; receiving, from the second wireless node, a first message indicating a third time when the second wireless node received the first PRS and a fourth time when the second wireless node transmitted the second PRS; estimating a clock error component between the first wireless node and the second wireless node, using the first time, the second time, the third time, and the fourth time; and transmitting, to a UE, a second message indicating the clock error component.

Certain aspects of the subject matter described in this disclosure can be implemented in an apparatus for wireless communications performed by a UE. The apparatus generally includes: at least one processor; and a memory coupled to the at least one processor, the memory including instructions executable by the at least one processor to cause the apparatus to: receive a first PRS from a first wireless node; receive a second PRS from a second wireless node; receive, from the first wireless node, an estimate of a first clock error component between the first wireless node and the second wireless node; and estimate a position of the apparatus, based on the first PRS, the second PRS, and the estimate of the first clock error component.

Certain aspects of the subject matter described in this disclosure can be implemented in an apparatus for wireless communications performed by a first wireless node. The apparatus generally includes: at least one processor; and a memory coupled to the at least one processor, the memory including instructions executable by the at least one processor to cause the apparatus to: transmit a first PRS at a first time; receive a second PRS from a second wireless node at a second time; receive, from the second wireless node, a first message indicating a third time when the second wireless node received the first PRS and a fourth time when the second wireless node transmitted the second PRS; estimate a clock error component between the apparatus and the second wireless node, using the first time, the second time, the third time, and the fourth time; and transmit, to a UE, a second message indicating the clock error component.

Certain aspects of the subject matter described in this disclosure can be implemented in an apparatus for wireless communications performed by a UE. The apparatus generally includes: means for receiving a first PRS from a first wireless node; means for receiving a second PRS from a second wireless node; means for receiving, from the first wireless node, an estimate of a first clock error component between the first wireless node and the second wireless node; and means for estimating a position of the apparatus, based on the first PRS, the second PRS, and the estimate of the first clock error component.

Certain aspects of the subject matter described in this disclosure can be implemented in an apparatus for wireless communications performed by a first wireless node. The apparatus generally includes: means for transmitting a first PRS at a first time; means for receiving a second PRS from a second wireless node at a second time; means for receiving, from the second wireless node, a first message indicating a third time when the second wireless node received the first PRS and a fourth time when the second wireless node transmitted the second PRS; means for estimating a clock error component between the apparatus and the second wireless node, using the first time, the second time, the third time, and the fourth time; and means for transmitting, to a UE, a second message indicating the clock error component.

Certain aspects of the subject matter described in this disclosure can be implemented in a computer-readable medium for wireless communications including instructions that, when executed by a processing system in UE, cause the processing system to perform operations including: receiving a first PRS from a first wireless node; receiving a second PRS from a second wireless node; receiving, from the first wireless node, an estimate of a first clock error component between the first wireless node and the second wireless node; and estimating a position of the UE, based on the first PRS, the second PRS, and the estimate of the first clock error component.

Certain aspects of the subject matter described in this disclosure can be implemented in a computer-readable medium for wireless communications including instructions that, when executed by a processing system in a first wireless node, cause the processing system to perform operations including: transmitting a first PRS at a first time; receiving a second PRS from a second wireless node at a second time; receiving, from the second wireless node, a first message indicating a third time when the second wireless node received the first PRS and a fourth time when the second wireless node transmitted the second PRS; estimating a clock error component between the first wireless node and the second wireless node, using the first time, the second time, the third time, and the fourth time; and transmitting, to a UE, a second message indicating the clock error component.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

FIGS. 5A-C are schematic illustrations of roadside service units (RSUs) and a vehicle performing sidelink positioning, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
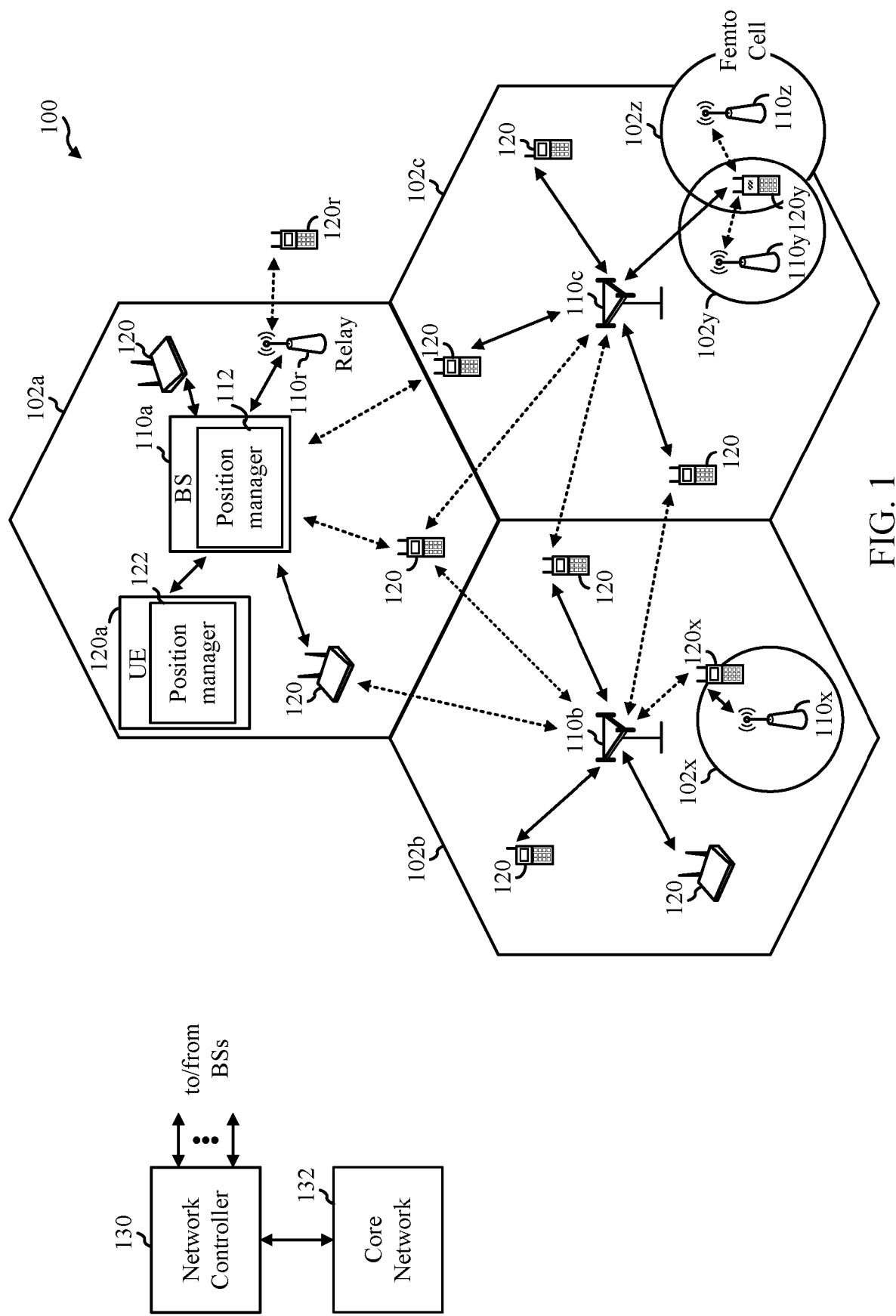
FIG. 1 is a block diagram conceptually illustrating an example wireless communication network, in accordance with certain aspects of the present disclosure.

Aspects of the present disclosure provide apparatus, methods, processing systems, and computer readable mediums for improving sidelink positioning accuracy using messaging between wireless nodes, e.g., roadside service units (RSUs), to supply information regarding clock error components. Because vehicles estimate vehicle location and clock error jointly, estimated locations may have significant error, and the quality of the estimated positions may be affected by the geometry of the vehicle and the wireless nodes. However, the techniques described herein may allow a vehicle (e.g., a user equipment (UE) or wireless device within a vehicle) to estimate a position of the vehicle based on positioning reference signals (PRSs) received from two or more wireless nodes and an estimate of a clock error between the two wireless nodes to reduce the complexity of estimation and more accurately estimate a position of the vehicle (e.g., UE).

The following description provides examples of improving sidelink positioning accuracy, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. The wireless communication network 100 may include one or more user equipments (UEs) and one or more base stations (BSs). As shown in FIG. 1, UE 120a includes position manager 122 configured to perform operations 800 of FIG. 8. Similarly, a BS 110a includes position manager 112 configured to perform operations 900 of FIG. 9 to assist UE 120a performing operations 800 of FIG. 8. Position managers 122 and 112 may be configured for improving sidelink positioning accuracy using messaging between wireless nodes to supply information regarding clock error components, in accordance with certain aspects of the present disclosure. Although not illustrated in FIG. 1, in some cases a wireless node performing operations 900 of FIG. 9 may be a UE-type wireless node (e.g., UE-type roadside service unit (RSU)), thus, a first position manager 122 may be configured to perform operations 800 for a UE and a second position manager 122 may be configured to perform operations 900 for the UE-type wireless node.

The wireless communication network 100 may be a new radio (NR) system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS may be a station that communicates with UEs. Each BS 110 may provide communication coverage for a particular geographic area, sometimes referred to as a "cell". In 3GPP, the term "cell" can refer to a coverage area of a Node B (NB) and/or a Node B subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be in communication with a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
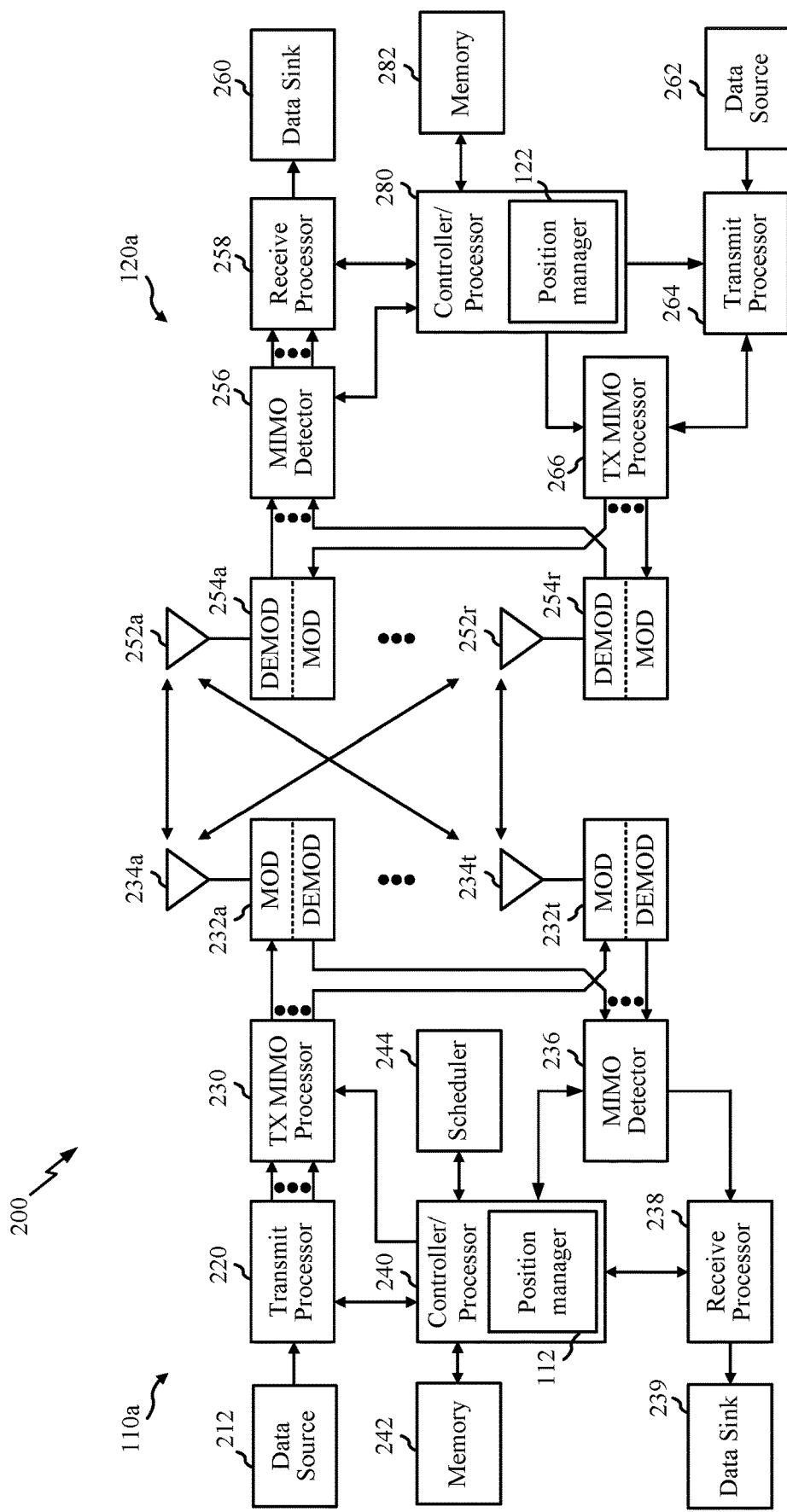
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure. For example, antennas 252, processors 266, 258, 264, and/or controller/processor 280, which includes position manager 122, of the UE 120a may be used to perform the various techniques and methods described herein. Similarly, antennas 234, processors 230, 238, 220, and/or controller/processor 240, which includes position manager 122, of the BS 110a may be used to perform the various techniques and methods described herein At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein.

NR may utilize OFDM with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RB s. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
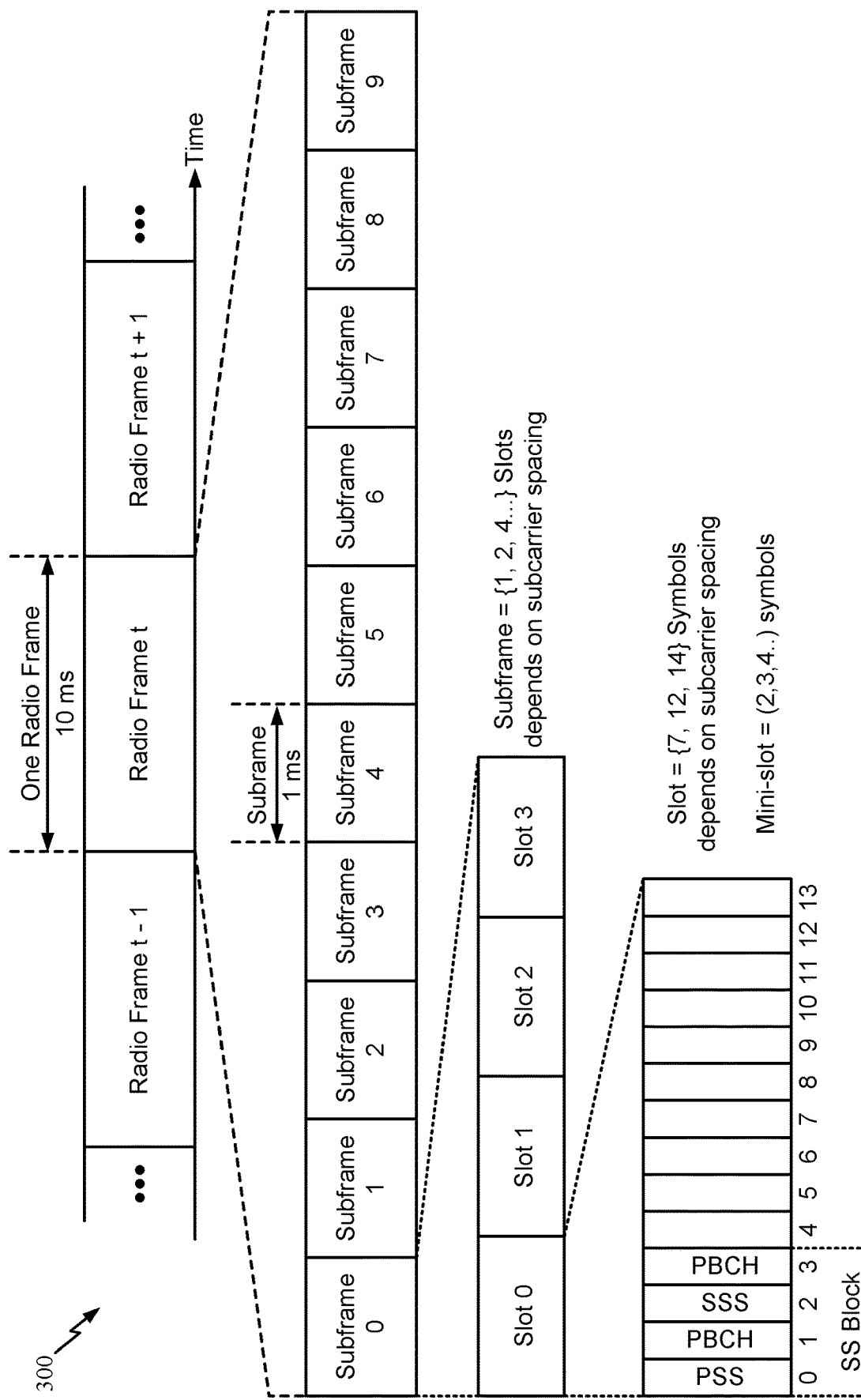
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4B:
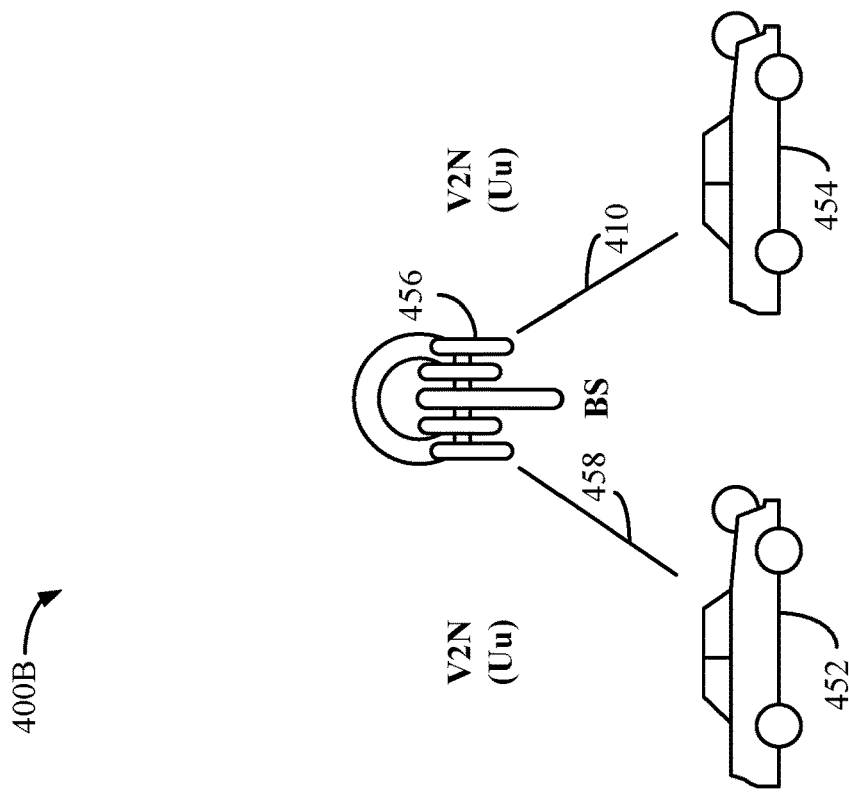
FIG. 4A and FIG. 4B show diagrammatic representations of example vehicle to everything (V2X) systems, in accordance with certain aspects of the present disclosure.
Figure 4A:
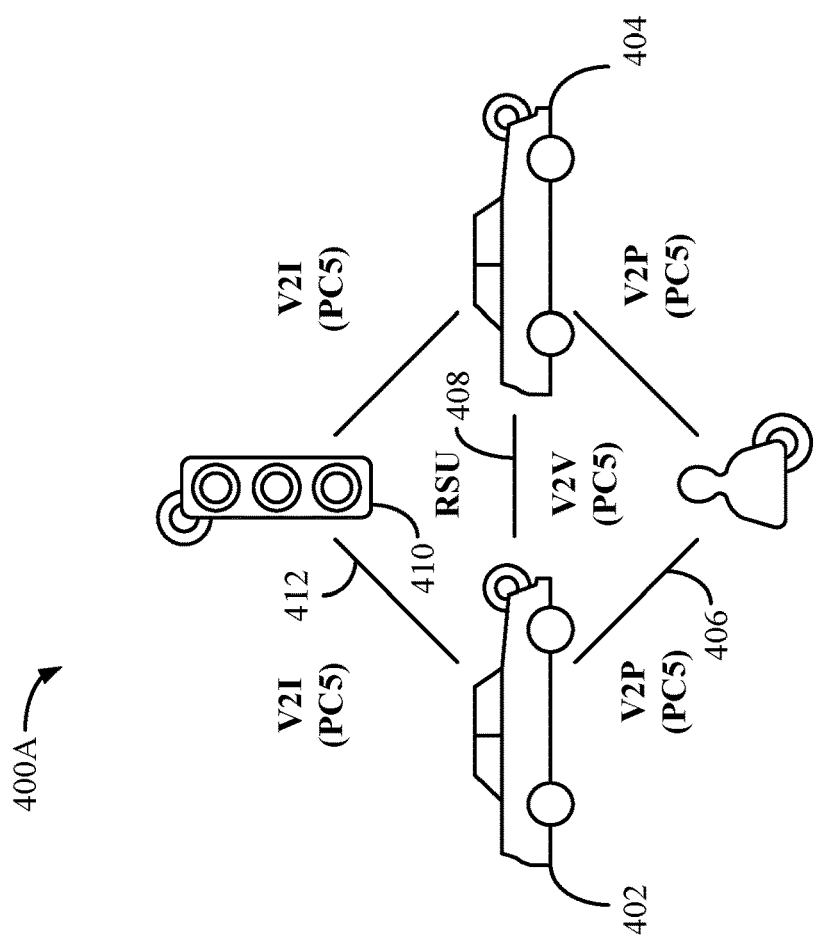

FIG. 4A and FIG. 4B show diagrammatic representations of example vehicle to everything (V2X) systems, in accordance with certain aspects of the present disclosure. For example, the vehicles shown in FIG. 4A and FIG. 4B may communicate via sidelink channels and may perform sidelink CSI reporting.

The V2X systems 400A and 400B, provided in FIG. 4A and FIG. 4B, respectively, provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400A (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (vehicle to pedestrian (V2P)) (for example, via a UE) through a PC5 interface. Communications between the vehicles 402 and 404 may also occur through a PC5 interface 408. In a like manner, communications may occur from a vehicle 402 to other highway components (for example, roadside service unit (RSU) 410), such as a traffic signal or sign (vehicle to infrastructure (V2I)) through a PC5 interface 412.

RSUs may have different classifications. For example, RSUs can be classified into UE-type RSUs and Micro NodeB-type RSUs. Micro NodeB-type RSUs have similar functionality as a Macro eNB or gNB. UE-type RSUs may use centralized resource allocation mechanisms to allow for efficient resource utilization.

With respect to each communication link illustrated in FIG. 4A, two-way communication may take place between elements, therefore each element may be a transmitter and a receiver of information. The V2X system 400A may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operations.

FIG. 4B shows a V2X system 400B for communication between a vehicle 452 and a vehicle 454 through a network entity 456. These network communications may occur through discrete nodes, such as a BS (e.g., BS 110a of FIGS. 1 and 2), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

RSUs may also be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects of the disclosure relate to sidelink communications, such as cellular-vehicular-to-anything (C-V2X) communications. C-V2X can offer vehicles low-latency V2V, V2I, and V2P communication. C-V2X networks can operate without cellular infrastructure support. For example, C-V2X communication allows direct communication between two UE devices, without transmissions through the BS, functioning by continuous monitoring and decoding of other UE devices. In C-V2X, vehicles can autonomously select their radio resources. For example, the vehicles may select resources, such as semi-persistent scheduling (SPS) resources, according to an algorithm. The algorithm may be a resource allocation algorithm specified by the 3GPP wireless standards.

Current 3GPP C-V2X design targets deployment in a licensed spectrum, either by deployment in a shared, licensed cellular band or by deployment in a dedicated intelligent transportation system (ITS) spectrum. In the licensed spectrum, the spectrum may be assigned exclusively to operators for independent usage. The licensed spectrum may either be shared or dedicated. Shared licensed spectrums provide bandwidth up to a specified level, and the bandwidth is shared among all subscribers. Therefore, in a licensed cellular band, a C-V2X system shares UL spectrum in the cellular network. On the other hand, dedicated internet spectrum provides guaranteed bandwidth at all times, thereby providing spectrum exclusivity when the C-V2X design is deployed in a dedicated ITS spectrum.

ITSs have been developed for decades to support a wide variety of safety-critical and traffic-efficient applications. Under current FCC rules, the 5.9 GHz band is reserved for dedicated short-range communication (DSRC), which facilitates both V2V and V2I communications.

Other countries and regions have also allocated spectrums around 5.9 GHz to V2X communications; however, dedicated spectrums may not be guaranteed in all locations due to spectrum scarcity. Spectrum scarcity has emerged as a primary problem encountered when trying to launch new wireless services in some regions. The effects of this scarcity have led some locations to allocate spectrums for LTE V2X only, leaving allocated spectrums unavailable for NR V2X. 3GPP Release 16 includes specification for 5G NR C-V2X which targets advanced V2X use cases, such as autonomous driving. Release16 5G NR C-V2X goes beyond technology that targets basic safety, by adding direct multicast communication technology for advanced safety, increased situational awareness, energy savings, and faster travel time.

In some cases, deployment of C-V2X communications involves deployment in an unlicensed spectrum. Unlicensed spectrum refers to radio frequency bands in which technical rules are specified for both the hardware and deployment methods of radio systems such that the band is open for shared use by an unlimited number of unaffiliated users. In unlicensed spectrum, the spectrum may be available for non-exclusive usage subject to some regulatory constraints (e.g., restrictions in transmission power).

In an unlicensed spectrum, a minimum channel bandwidth may be specified in accordance with regional regulations, and any technological device may transmit in a bandwidth greater than the specified minimum channel bandwidth. For example, in some regions, the minimum channel bandwidth may be set at 5 megahertz (MHz). There exists a wide range of unlicensed spectrums available from 5 gigahertz (GHz) to 6 GHz (e.g., Unlicensed National Information Instructure 3 (U-NII-3) operating between 5.725 GHz and 5.850 GHz or U-NII-4 operating between 5.850 GHz and 5.925 GHz). As used herein, the 5 GHz unlicensed spectrum, also referred to as the U-NII band, comprises the frequency range between 5150 MHz and 5925 MHz. The 6 GHz unlicensed spectrum potentially comprises the frequency range from 5925 MHz up to 7125 MHz.

In contrast with most licensed assignments of spectrum use rights, devices or systems operating on an unlicensed basis enjoy no regulatory protection against interference from other licensed or unlicensed users in the band. Currently, the unlicensed spectrum may be utilized by Wireless Local Area Networks (WLAN), such as the ones that are based on IEEE 801.11a/g/n/ac technologies, which are also referred to as Wi-Fi systems. For example, a Wi-Fi device may transmit, for example, in a channel bandwidth of 20 MHz, 80 MHz, 160 MHz, or any other channel bandwidth above 5 MHz.

C-V2X communications deployed in an unlicensed spectrum may operate in either a distributed or a centralized manner. In distributed C-V2X, UEs communicate independently without the assistance of a central node (e.g., a BS) scheduling transmissions between the UEs. In centralized C-V2X, a central node controls and assists with sidelink communications.

Although continuous monitoring may help to effectuate sidelink communication, UEs in an unlicensed spectrum may be incapable of meeting these demands. Continuous monitoring of all carriers/frequencies for potential sidelink transmission may be an unrealistic expectation when a UE is deployed in an unlicensed spectrum due to the wide range of available spectrums (e.g., U-NII-3 or U-NII-4) in the unlicensed band coupled with the band's limited capability.

Accordingly, capability of the UE to transmit and receive in a limited number of carriers (e.g., frequencies) known to all UEs is beneficial to reduce the UE's burden of monitoring all carriers within in an unlicensed band. For example, this burden may be alleviated where UEs have common understanding of carrier(s) used for C-V2X communication. However, statically limiting C-V2X communications to a specific unlicensed carrier may lead to sub-optimal performance, such as an increased probability of interference with other technologies within the band (other technologies may access the unlicensed spectrum as long as they comply with regulatory requirements).

Example Sidelink Positioning

According to aspects of the present disclosure, sidelink positioning may include transmitting, receiving, and measuring positioning reference signals (PRSs) to and from two or more RSUs and a vehicle.

In aspects of the present disclosure, sidelink positioning may further include roundtrip time (RTT) based positioning using PRSs on unlicensed spectrum.

According to aspects of the present disclosure, using intelligent transportation system (ITS) messaging in the V2X spectrum, RSUs and a vehicle may be grouped. The RSUs and the vehicle in the group may perform group listen before talk (LBT), wherein an initiator (e.g., one of the RSUs) reserves time slots for PRS transmissions by members of the group.

In aspects of the present disclosure, PRSs may be broadcast sequentially, with each RSU in the group transmitting a PRS, and then the vehicle transmitting a PRS. The time of arrival (ToA) of PRSs may then be exchanged using ITS messaging in the V2X spectrum.

According to aspects of the present disclosure, a vehicle may estimate a location of the vehicle and clock error, based on the ToA and using, for example, a Kalman filter.

FIGS. 5A-C are schematic illustrations 500A, 500B, and 500C of RSUs 502, 510, and 520 and vehicle 530 performing sidelink positioning, in accordance with certain aspects of the present disclosure. FIG. 5B schematically illustrates the timeline 500B of the various transmissions. FIG. 5C schematically illustrates the timeline 500C of transmissions between RSU 502 and vehicle 530.

As illustrated in FIG. 5A, RSU 502 transmits a first PRS 504 at a time 542 (see FIG. 5B). RSU 510 transmits a second PRS 512 at time 544. Similarly, RSU 520 transmits a third PRS 522 at time 546. The vehicle transmits a fourth PRS 532 (which is received by each of RSU 502, 510, and 520) at time 548. RSU 502 transmits a first ITS message 506 at time 550 that indicates the time 542 at which the RSU 502 transmitted the first PRS 504 and the time 562 (see FIG. 5C) when the RSU 502 received the fourth PRS 532 from vehicle 530. Similarly, RSU 510 transmits a second ITS message 514 at time 552 that indicates the time at which the RSU 510 transmitted the second PRS 512 and the time at which the RSU 510 received the fourth PRS 532 from vehicle 530. RSU 520 transmits a third ITS message 524 at time 554 that indicates the time at which the RSU 520 transmitted the third PRS 522 and the time at which the RSU 520 received the fourth PRS 532 from the vehicle. As mentioned above, each of the time slots 542, 544, 546, 548, 550, 552, and 554 may have been reserved via a group LBT process.

According to aspects of the present disclosure, in order to estimate its own location, a vehicle (e.g., vehicle 530 in FIG.

5A) also needs to estimate its clock error from RTT. In aspects of the present disclosure, the vehicle may be able to resolve this joint estimation (i.e., estimating both the vehicle's location and clock error) when the angular change in PRS is large enough over the trajectory of estimation.

Figure 6:
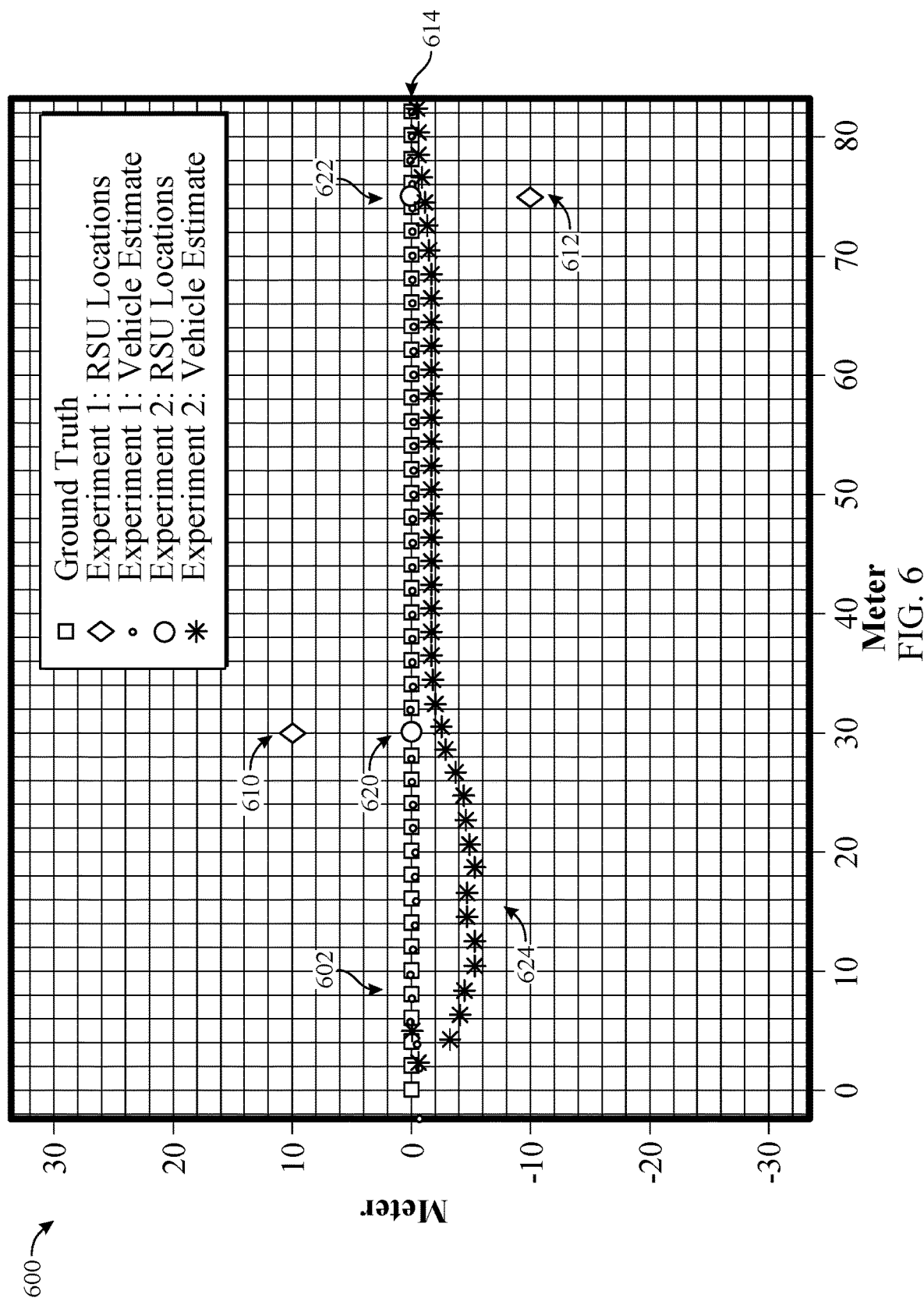
FIG. 6 is a graph comparing estimated positions of a vehicle in two experiments with actual positions of the vehicle, in accordance with certain aspects of the present disclosure.

FIG. 6 is a graph 600 comparing estimated positions of a vehicle (e.g., vehicle 530 in FIG. 5A) in two experiments with actual positions of the vehicle, in accordance with certain aspects of the present disclosure. The squares along path 602 illustrate the actual positions of the vehicle.

For a first experiment, locations of two RSUs (e.g., RSU 502 and RSU 510 in FIG. 5A) are shown at 610 and 612. The estimated positions 614 of the vehicle in the first experiment are shown with dots. In the first experiment, large angular changes between the vehicle and the RSUs 610 and 612 leads to relatively good estimates 614 of the vehicle position.

For a second experiment, locations of two RSUs (e.g., RSUs 502 and 510 in FIG. 5A) are shown at 620 and 622. The estimated positions 624 of the vehicle in the second experiment are shown with asterisks. In the second experiment, small angular changes between the vehicle and the RSUs leads to estimated positions 624 of the vehicle position that are worse than the estimated positions 614 obtained in the first experiment. The difference between the quality of the vehicle position estimates of the two experiments may be related to the vehicle estimating the two components (e.g., vehicle location and clock error) jointly.

According to aspects of the present disclosure, because vehicles estimate vehicle location and clock error jointly, the estimated locations may have significant error, and the quality of the estimated positions may be affected by the geometry of the vehicle and RSUs.

The following equation illustrates the joint estimation that the vehicle may perform, with reference to FIG. 5C:

$$z_n = (t_4 - t_3) + (t_2 - t_1) = \frac{\|r - x(t_n)\|}{v_{light}} + \alpha,$$

where:

| | |
|---|---|
| z | round trip time (RTT) between the vehicle and the RSU; |
| $t_4$ | time (reported by the RSU) that the RSU receives a PRS from the vehicle; |
| $t_3$ | time (per the vehicle clock) that the vehicle transmitted a PRS; |
| $t_2$ | time (per the vehicle clock) that the vehicle received a PRS from the RSU; |
| $t_1$ | time (reported by the RSU) that the RSU transmitted a PRS; |
| r | location of the RSU; |
| $x(t_n)$ | estimate of position of the vehicle at time t; |
| $v_{light}$ | the speed of light, also referred to as c |
| $\alpha$ | clock error |

Accordingly, what is needed are techniques and apparatus for using the auxiliary ITS message exchange between RSUs in order to more accurately estimate a position of a vehicle. In aspects of the present disclosure, a vehicle and two or more wireless nodes, e.g., RSUs, may use the RTT PRS message exchanges between the wireless nodes and estimate clock errors at the wireless nodes so that the vehicle may be able to reduce the complexity of estimation and more accurately estimate a position of the vehicle.

Example Improving Sidelink Positioning Via Messaging Between Wireless Nodes

Aspects of the present disclosure provide techniques for improving sidelink positioning accuracy using messaging between wireless nodes to supply information regarding clock error components. A user equipment (UE) (e.g., a wireless device within a vehicle) may estimate a position of the UE based on positioning reference signals (PRSs) received from two or more wireless nodes and an estimate of the clock error between the two wireless nodes.

As used herein, a wireless node may be any reference node that has knowledge of its position (i.e., either by GPS or manual configuration) beyond a degree of accuracy. A reference node's position awareness may only be accurate up to a certain degree; thus, reference nodes may communicate this known level of accuracy to other wireless nodes for positioning estimation. In some cases, for example, a wireless node may be a roadside service unit (RSU).

Figure 7:
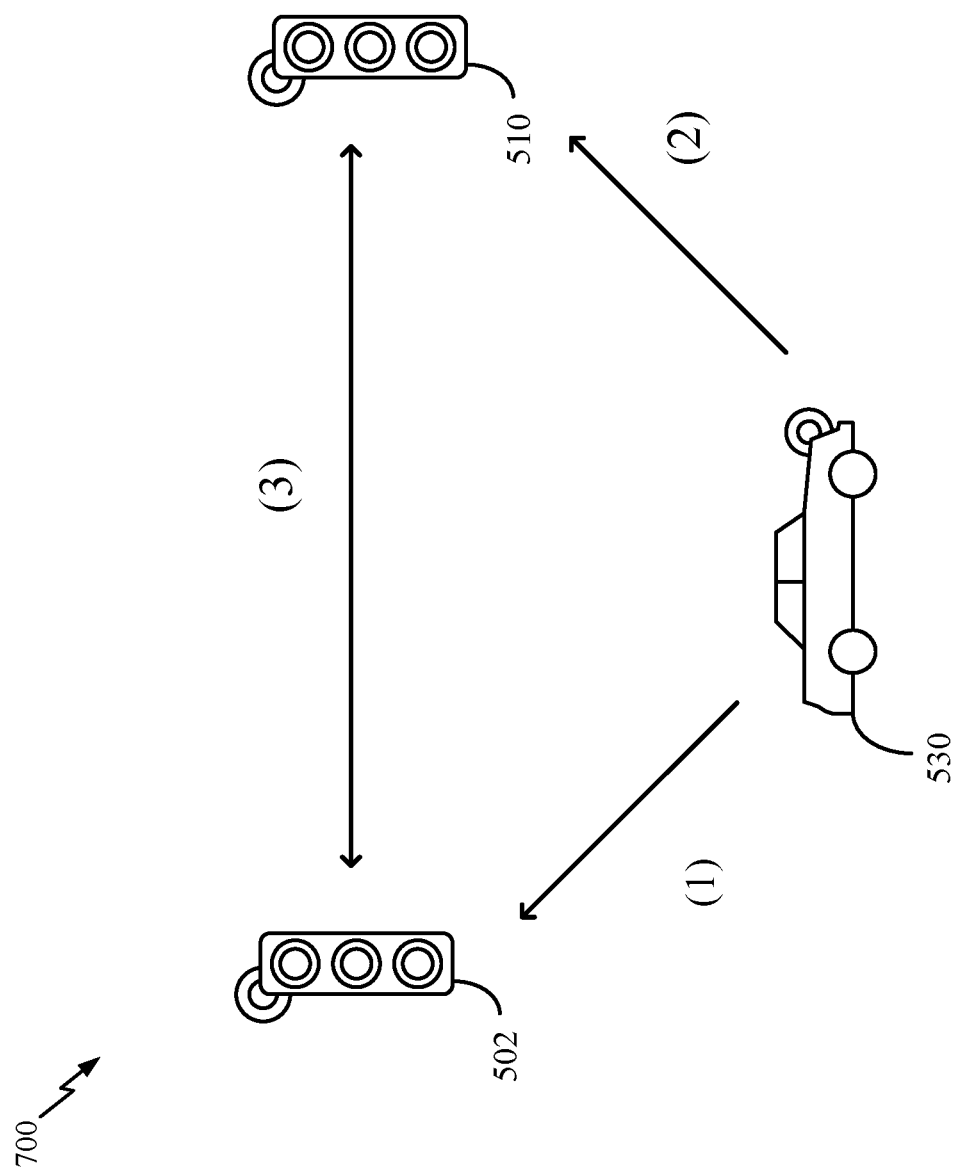
FIG. 7 is a schematic illustration of RSUs and a vehicle performing sidelink positioning, in accordance with certain aspects of the present disclosure.

FIG. 7 is a schematic illustration 700 of RSUs and vehicle (e.g., RSUs 502 and 510 and vehicle 530 of FIG. 5A) performing sidelink positioning, in accordance with certain aspects of the present disclosure. According to aspects of the present disclosure, during a PRS and intelligent transportation system (ITS) message exchange between the pair of RSUs 502, 510, the RSUs 502, 510 may also exchange information regarding when each RSU 502, 510 transmitted its PRS and when each RSU 502, 510 received the corresponding PRS from the other RSU. One RSU (e.g., the initiator RSU or RSU 502 in FIG. 5A) may estimate a clock error component between the RSUs 502 and 510 and supply that clock error component to the vehicle 530 (e.g., in an ITS message). Accordingly, joint estimation by vehicle 530 may not be necessary, and therefore, the vehicle 530's estimation of the position of vehicle 530 may become more accurate as more PRS samples are transmitted and received by RSUs 502, 510 and vehicle 530.

The calculation of the error components and the positioning are as follows:

$$z = \frac{\|rsu_1 - v\|}{c} + e_1; \quad \text{(calculated at (1) in FIG. 7)}$$

$$z = \frac{\|rsu_2 - v\|}{c} + e_2; \quad \text{(calculated at (2) in FIG. 7)}$$

$$z = \frac{\|rsu_1 - rsu_2\|}{c} + e_3; \quad \text{(calculated at (3) in FIG. 7)}$$

where:

$$e_1 = (a_{r_1}^{tx} - a_{r_1}^{rx} + a_v^{tx} - a_v^{rx})$$

$$e_2 = (a_{r_2}^{tx} - a_{r_2}^{rx} + a_v^{tx} - a_v^{rx})$$

$$e_3 = (a_{r_1}^{tx} - a_{r_1}^{rx} + a_{r_2}^{tx} - a_{r_2}^{rx})$$

and $a_x^y$ is the clock error of device x ($r_1$ refers to RSU 1, $r_2$ refers to RSU 2, and v refers to the vehicle) at group delay y (tx refers to transmission of a PRS, rx refers to reception of a PRS).

According to aspects of the present disclosure, the error $e_3$ may be given by the last equation and may be the clock error component of RSU 502 and RSU 510.

In aspects of the present disclosure, at the ITS message exchange stage (e.g., times 550, 552, and 554 in FIG. 5B), the RSU 502 may transmit the $e_3$ information to vehicle 530, in addition to the information regarding when RSU 502 transmitted the corresponding PRS and when RSU 502 received the PRS from vehicle 530.

As described above, in previously known techniques, vehicle 530 estimates $e_1$ and $e_2$ from each PRS measurement. According to certain aspects, since $e_3$ is known to vehicle 530, vehicle 530 combines estimation of $e_1$ and $e_2$ together (e.g., by estimating $e_1+e_2-e_3$, with $e_3$ supplied by RSU 502). Thus, in aspects of the present disclosure, vehicle 530 may estimate only the vehicle 530's location and one clock error component, instead of multiple bias values, as in previously known techniques.

According to certain aspects, wireless nodes (e.g., RSUs) may use ITS message exchange to exchange PRS samples with one another, to allow each wireless node to identify and a measure time of arrival (ToA) of PRSs transmitted by each wireless node.

According to certain aspects, a wireless node (e.g., RSU) may estimate a clock error component (between itself and another wireless node) $e_3$ using a Kalman filter or other technique.

According to certain aspects, in some cases, wireless nodes (e.g., RSUs) may be synchronized, thus a clock error component between a first wireless node and another wireless node may be zero. For example, two RSUs fixed on a lamppost may be said to be synchronized. Thus, a calculated timing error between the two RSUs may be zero.

According to certain aspects, a wireless node (e.g., RSU) may transmit $e_3$ information to a vehicle as long as the wireless node has collected enough PRS samples (e.g., three PRS samples) from another wireless node.

According to certain aspects, a vehicle might trigger a wireless node (e.g., RSU) to supply $e_3$ information to the vehicle. As described herein, a trigger may be a transmitted or signaled request. In this example, the vehicle may request the RSU supply $e_3$ information to the vehicle. In response to the trigger, the RSU transmits the $e_3$ information to the vehicle.

According to certain aspects, a vehicle may combine PRS measurements received from wireless nodes (e.g., RSUs) and then estimate the clock error between the vehicle and each wireless node.

According to certain aspects, a UE may receive PRSs from multiple wireless nodes (e.g., more than two wireless nodes). In some cases involving multiple wireless nodes, one wireless node of the multiple wireless nodes may be a master wireless node (e.g., in a hierarchical structure). Accordingly, the UE may receive, from the master wireless node, estimates of a first clock error component between each node pair of the multiple wireless nodes. The UE may estimate a position of the UE based on the multiple PRSs and the estimates of the first clock error component between each node pair. For example, a UE may receive PRSs from three RSUs (e.g., RSU 1, RSU 2, and RSU 3). Assuming RSU 1 and RSU 2 make up a first node pair, RSU 1 and RSU 3 make up a second node pair, RSU 2 and RSU 3 make up a third node pair, and RSU 1 is the master node, RSU 1 may receive three estimates of a first clock error component: a first estimate of a first clock error component between RSU 1 and RSU 2, a second estimate of a first clock error component between RSU 1 and RSU 3, and a third estimate of a first clock error component between RSU 2 and RSU 3. The master node, RSU 1, may transmit the three estimates to the UE thereby allowing the UE to estimate a position of the UE based on the multiple PRSs and the three estimates of the first clock error component between each node pair.

In some other cases involving multiple wireless nodes (and where there is no master wireless node), a wireless node of each node pair may transmit its corresponding estimate of the first clock error component to the UE. For example, given the example provided, either RSU 1 or RSU 2 may transmit the first estimate of the first clock error component to the UE, either RSU 1 or RSU 3 may transmit the second estimate of the first clock error component to the UE, and either RSU 2 or RSU 3 may transmit the third estimate of the first clock error component to the UE. The UE may estimate a position of the UE based on the multiple PRSs and the three estimates of the first clock error component between each node pair.

According to certain aspects, in cases involving multiple wireless nodes (e.g., RSUs), there may be a mixture of synchronous and non-synchronous nodes transmitting PSRs and clock error components to the UE.

Figure 8:
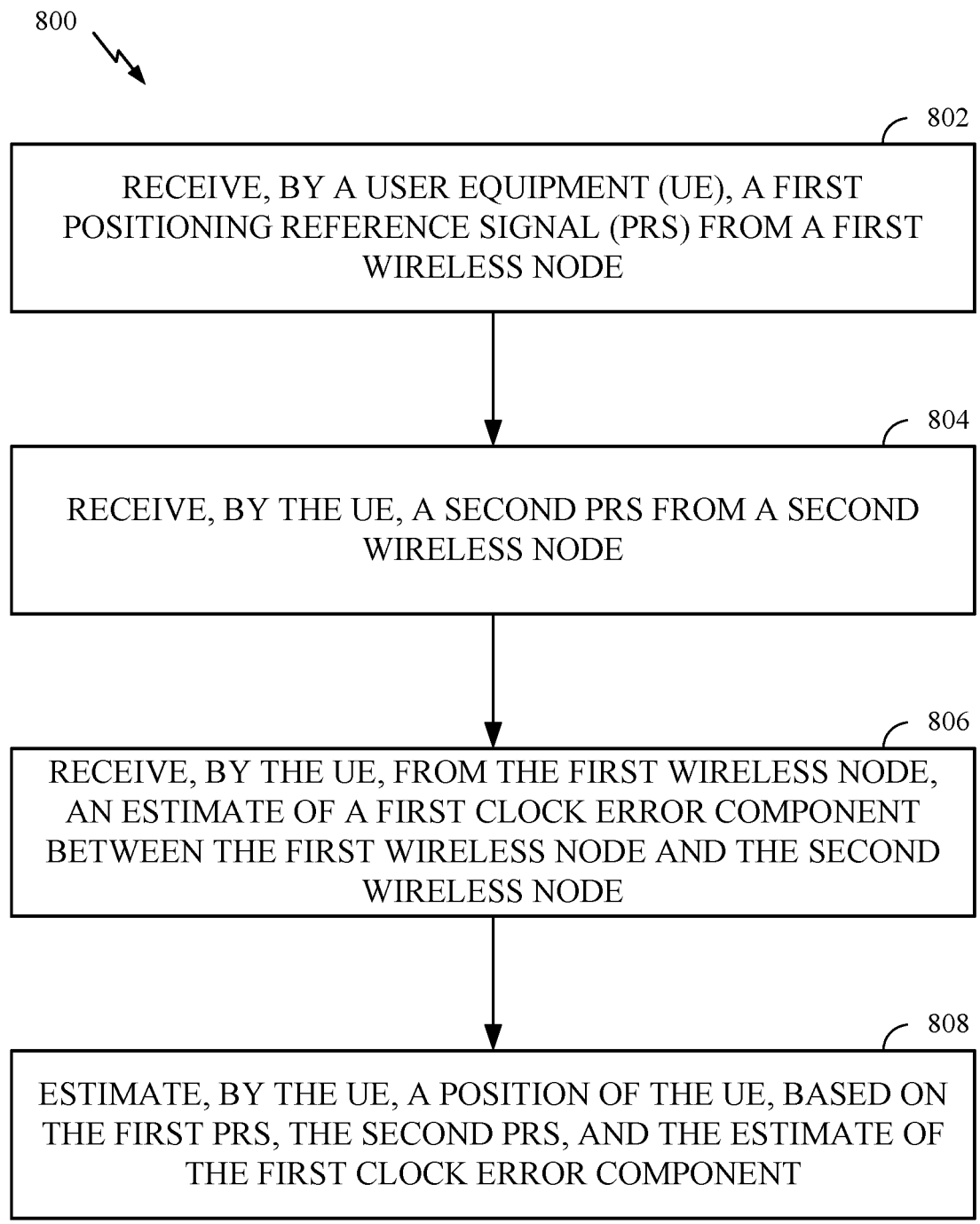
FIG. 8 is a flow diagram illustrating example operations for wireless communication by a UE, in accordance with certain aspects of the present disclosure.

FIG. 8 is a flow diagram illustrating example operations 800 for wireless communication by a UE, in accordance with certain aspects of the present disclosure. The operations 800 may be performed, for example, by UE 120*a* in the wireless communication network 100 of FIG. 1. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, by a UE receiving a first PRS from a first wireless node. At block 804, the UE receives a second PRS from a second wireless node. According to certain aspects, at least one of the first wireless node or second wireless node comprises an RSU.

At block 806, the UE receives, from the first wireless node, an estimate of a first clock error component between the first wireless node and the second wireless node.

At block 808, the UE estimates a position of the UE, based on the first PRS, the second PRS, and the estimate. According to certain aspects, the estimate of block 806 may be received via an ITS message.

In aspects of the present disclosure, estimating the position of the UE, as in block 808, may include: measuring a first time difference of arrival (TDOA) of the first PRS, measuring a second TDOA of the second PRS, estimating a second clock error component between the UE and the first wireless node, based on the estimate of the first clock error component, determining a first distance from the first wireless node based on the first TDOA and the second clock error component, estimating a third clock error component between the UE and the second wireless node, based on the estimate; determining a second distance from the second wireless node based on the second TDOA and the third clock error component, and determining the position of the UE based on the first distance, the second distance, a position of the first wireless node, and a position of the second wireless node.

According to certain aspects, a UE performing operations 800 may send a trigger to the first RSU requesting the first RSU to transmit the estimate of the first clock error component of block 806 and the UE may receive the estimate of the first clock error component in accordance with the trigger.

Figure 9:
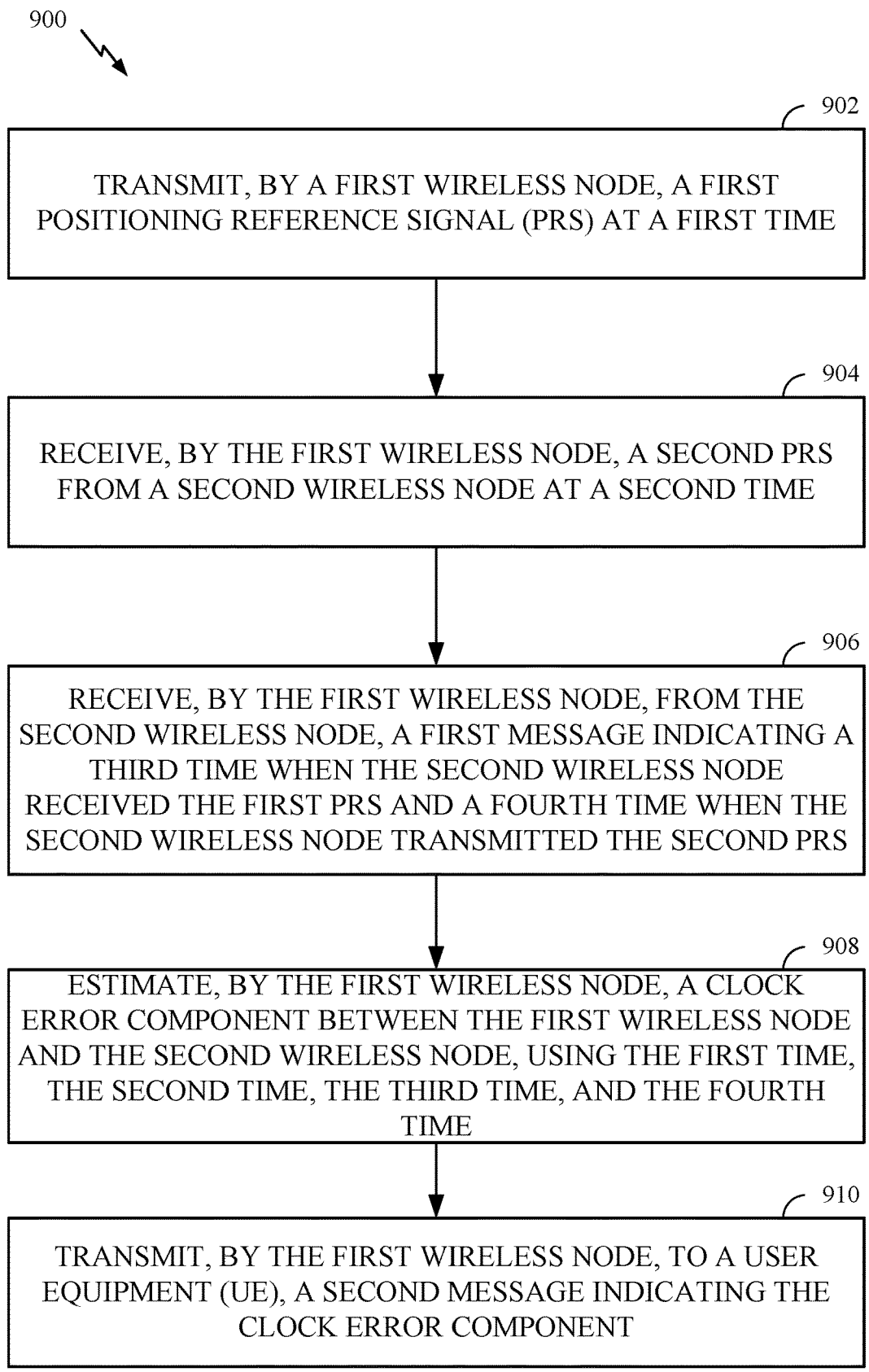
FIG. 9 is a flow diagram illustrating example operations for wireless communication by a BS, in accordance with certain aspects of the present disclosure.

FIG. 9 is a flow diagram illustrating example operations 900 for wireless communication by a first wireless node, in accordance with certain aspects of the present disclosure. In cases where the first wireless node is a NodeB-type wireless node (e.g., NodeB-type wireless node), the operations 900 may be performed, for example, by a BS (e.g., the BS 110*a* in the wireless communication network 100). In cases where the first wireless node is a UE-type wireless node (e.g., UE-type RSU), the operations 900 may be performed, for example, by a UE (e.g., the UE 120*a* in the wireless communication network 100). The operations 900 may be complementary to the operations 800 performed by a UE. The operations 900 may be implemented as software components that are executed and run on one or more processors (e.g., controller/processor 280 of FIG. 2). Further, the transmission and reception of signals by the first wireless node in operations 900 may be enabled, for example, by one or more antennas (e.g., antennas 234 or 252 of FIG. 2). In certain aspects, the transmission and/or reception of signals by the first wireless node may be implemented via a bus interface of one or more processors (e.g., controller/processor 240 or 280) obtaining and/or outputting signals.

The operations 900 may begin, at block 902, by a first wireless node transmitting a first PRS at a first time. At block 904, the first wireless node receives a second PRS from a second wireless node at a second time. According to certain aspects, at least one of the first wireless node or second wireless node comprises an RSU.

At block 906, the first wireless node receives, from the second wireless node, a first message indicating a third time when the second wireless node received the first PRS and a fourth time when the second wireless node transmitted the second PRS.

At block 908, the first wireless node estimates a clock error component between the first wireless node and the second wireless node, using the first time, the second time, the third time, and the fourth time.

At block 910, the first wireless node transmits, to a UE, a second message indicating the clock error component. According to certain aspects, the second message of block 910 further indicates the first time of block 902.

According to certain aspects, the first message of block 906 may be an ITS message, and the second message of block 910 may be another ITS message.

According to certain aspects, a first wireless node performing operations 900 may obtain or receive a trigger from the UE to transmit the clock error component to the UE and transmit the clock error component in accordance with the received trigger.

Example Wireless Communications Devices

Figure 10:
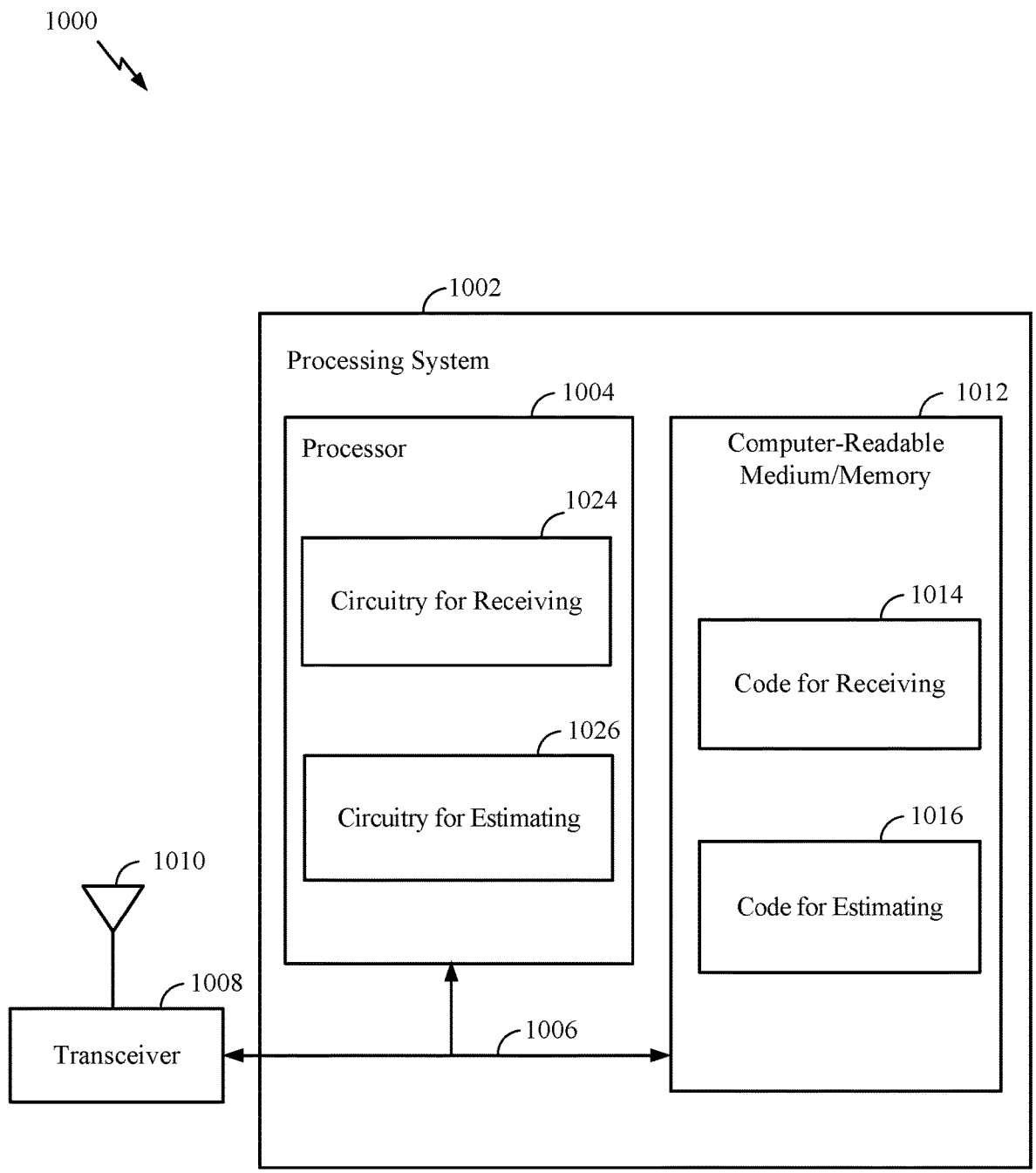
FIG. 10 illustrates a communications device that may include various components configured to perform the operations illustrated in FIG. 8, in accordance with aspects of the present disclosure.

FIG. 10 illustrates a communications device 1000 that includes various components operable, configured, or adapted to perform operations for the techniques disclosed herein, such as the operations illustrated in FIG. 8. In some examples, communications device 1000 may be a user equipment (UE), such as UE 120*a* described with respect to FIGS. 1 and 2.

Communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

Processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for improving sidelink positioning via messaging between wireless nodes (e.g., RSUs).

In certain aspects, computer-readable medium/memory 1012 stores code 1014 for receiving and code 1016 for estimating.

In some cases, code 1014 for receiving may include code for receiving a first PRS from a first wireless node. In some cases, code 1014 for receiving may include code for receiving a second PRS from a second wireless node. In some cases, code 1014 for receiving may include code for receiving, from the first wireless node, an estimate of a first clock error component between the first wireless node and the second wireless node. In some cases, code 1016 for estimating may include code for estimating a position of the UE based on the first PRS, the second PRS, and the estimate of the first clock error component.

In certain aspects, the processor 1004 has circuitry configured to implement the code stored in the computer-readable medium/memory 1012. The processor 1004 includes circuitry 1024 for receiving and circuitry 1026 for estimating.

In some cases, circuitry 1024 for receiving may include circuitry for receiving a first PRS from a first wireless node. In some cases, circuitry 1024 for receiving may include circuitry for receiving a second PRS from a second wireless node. In some cases, circuitry 1024 for receiving may include circuitry for receiving, from the first wireless node, an estimate of a first clock error component between the first wireless node and the second wireless node. In some cases, circuitry 1026 for estimating may include circuitry for estimating may include code for estimating a position of the UE based on the first PRS, the second PRS, and the estimate of the first clock error component.

In some cases, the operations illustrated in FIG. 8, as well as other operations described herein, may be implemented by one or more means-plus-function components. For example, in some cases, such operations may be implemented by means for receiving and means for estimating.

In some cases, means for estimating, includes a processing system, which may include one or more processors, such as the receive processor 258, the transmit processor 264, the TX MIMO processor 266, and/or the controller/processor 280 of the UE 120*a* illustrated in FIG. 2 and/or the processing system 1002 of the communication device 1000 in FIG. 10.

The transceiver 1008 may provide a means for receiving or transmitting information. Information may be passed on to other components of the communications device 1000. The antenna 1010 may correspond to a single antenna or a set of antennas. The transceiver 1008 may provide means for transmitting signals generated by other components of the communications device 1000.

Means for receiving or means for obtaining may include a receiver (such as the receive processor 258) or antenna(s) 252 of the UE 120*a* illustrated in FIG. 2. Means for transmitting or means for outputting may include a transmitter (such as the transmit processor 264) or antenna(s) 252 of the UE 120*a* illustrated in FIG. 2.

Notably, FIG. 10 is just use one example, and many other examples and configurations of communications device 1000 are possible.

Figure 11:
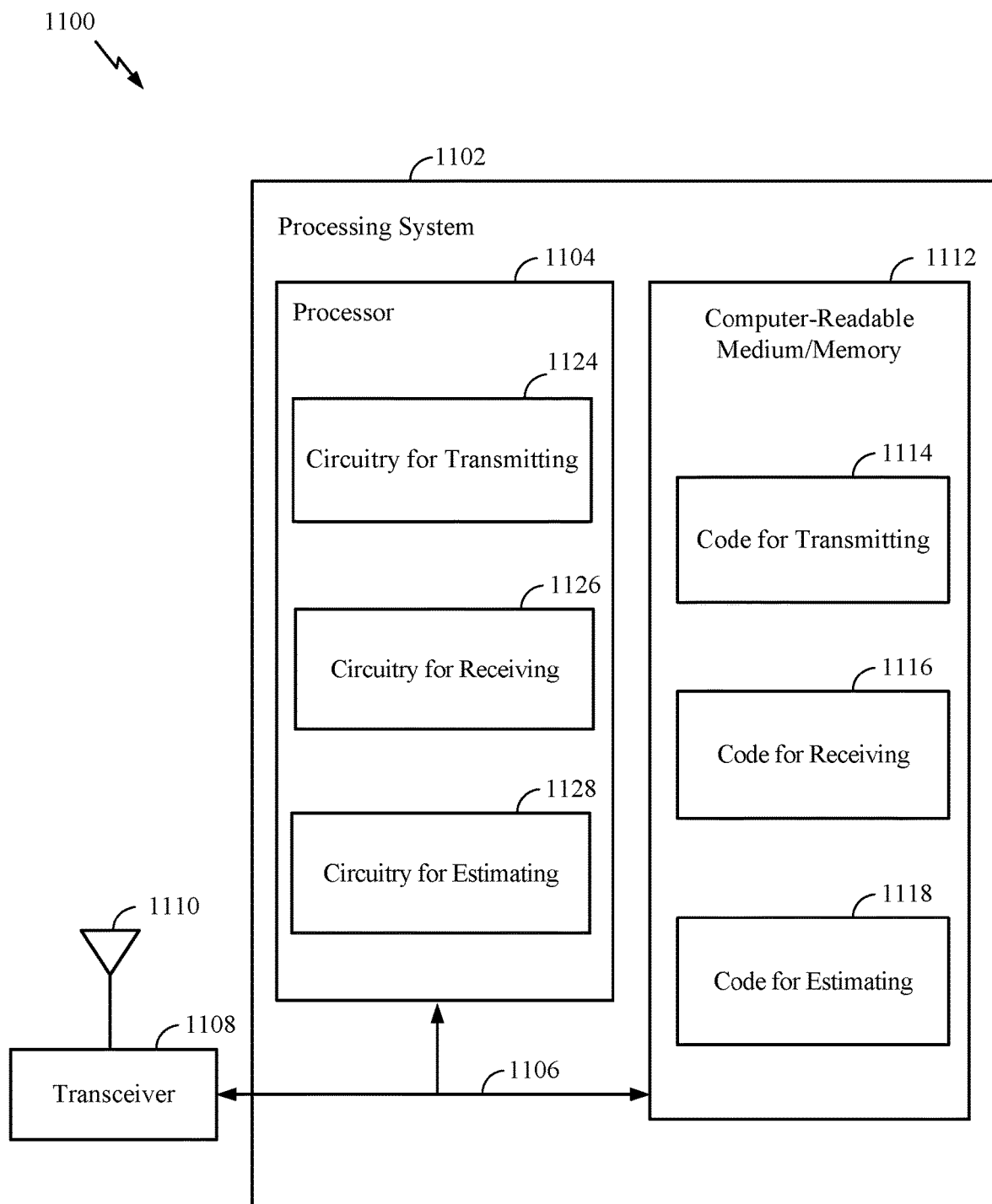
FIG. 11 illustrates a communications device that may include various components configured to perform the operations illustrated in FIG. 9, in accordance with aspects of the present disclosure.

FIG. 11 illustrates a communications device 1100 that may include various components operable, configured, or adapted to perform operations for the techniques disclosed herein, such as the operations illustrated in FIG. 9. In some examples, communications device 1100 may be a base station (BS), such as BS 110a described with respect to FIGS. 1 and 2. In some examples, communications device 1100 may be a UE, such as UE 120a described with respect to FIGS. 1 and 2.

Communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

Processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for improving sidelink positioning via messaging between wireless nodes (e.g., RSUs)

In certain aspects, computer-readable medium/memory 1112 stores code 1114 for transmitting; code 1116 for receiving; and code 1118 for estimating.

In some cases, code 1114 for transmitting may include code for transmitting a first PRS at a first time. In some cases, code 1114 for transmitting may include code for transmitting, to a UE, a second message indicating the clock error component. In some cases, code 1116 for receiving may include code for receiving a second PRS from a second wireless node at a second time. In some cases, code 1116 for receiving may include code for receiving, from the second wireless node, a first message indicating a third time when the second wireless node received the first PRS and a fourth time when the second wireless node transmitted the second PRS. In some cases, code 1118 for estimating may include code for estimating a clock error component between the first wireless node and the second wireless node, using the first time, the second time, the third time, and the fourth time.

In certain aspects, the processor 1104 has circuitry configured to implement the code stored in the computer-readable medium/memory 1112. The processor 1104 includes circuitry 1124 for transmitting; circuitry 1126 for receiving; and circuitry 1128 for estimating.

In some cases, circuitry 1124 for transmitting may include circuitry for transmitting a first PRS at a first time. In some cases, circuitry 1124 for transmitting may include circuitry for transmitting, to a UE, a second message indicating the clock error component. In some cases, circuitry 1126 for receiving may include circuitry for receiving may include code for receiving a second PRS from a second wireless node at a second time. In some cases, circuitry 1126 for receiving may include circuitry for receiving, from the second wireless node, a first message indicating a third time when the second wireless node received the first PRS and a fourth time when the second wireless node transmitted the second PRS. In some cases, circuitry 1128 for estimating may include circuitry for estimating may include code for estimating a clock error component between the first wireless node and the second wireless node, using the first time, the second time, the third time, and the fourth time.

In some cases, the operations illustrated in FIG. 9, as well as other operations described herein, may be implemented by one or more means-plus-function components. For example, in some cases, such operations may be implemented by means for receiving and means for estimating.

In some cases, means for estimating, includes a processing system, which may include one or more processors, such as the receive processor 258 or 238, the transmit processor 264 or 220, the TX MIMO processor 266 or 230, and/or the controller/processor 280 or 240 of the UE 120a or BS110a, respectively, illustrated in FIG. 2 and/or the processing system 1102 of the communication device 1100 in FIG. 11.

The transceiver 1108 may provide a means for receiving or transmitting information. Information may be passed on to other components of the communications device 1100. The antenna 1110 may correspond to a single antenna or a set of antennas. The transceiver 1108 may provide means for transmitting signals generated by other components of the communications device 1100.

Means for receiving or means for obtaining may include a receiver (such as the receive processor 258 or 238) or antenna(s) 252 or 234 of the UE 120a or BS 110a, respectively, illustrated in FIG. 2. Means for transmitting or means for outputting may include a transmitter (such as the transmit processor 264 or 220) or antenna(s) 252 or 234 of the UE 120a or BS110a, respectively, illustrated in FIG. 2.

Notably, FIG. 11 is just use one example, and many other examples and configurations of communications device 1100 are possible.

The position manager 122 or 112 may support wireless communication in accordance with examples as disclosed herein.

The position manager 122 or 112 may be an example of means for performing various aspects described herein. The position manager 122 or 112, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the position manager 122 or 112, or its sub-components, may be implemented in code (e.g., as configuration management software or firmware) executed by a processor, or any combination thereof. If implemented in code executed by a processor, the functions of the position manager 122 or 112, or its sub-components may be executed by a general-purpose processor, a DSP, an ASIC, a FPGA or other programmable logic device.

In some examples, the position manager 122 or 112 may be configured to perform various operations (e.g., receiving, determining, transmitting) using or otherwise in cooperation with the transceiver 1008 or 1108.

The position manager 122 or 112, or its sub-components, may be physically located at various positions, including being distributed such that portions of functions are implemented at different physical locations by one or more physical components. In some examples, the position manager 122 or 112, or its sub-components, may be a separate and distinct component in accordance with various aspects of the present disclosure. In some examples, the position manager 122 or 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses Implementation examples are described in the following numbered clauses:

Clause 1: A method for wireless communications performed by a user equipment (UE), comprising: receiving a first positioning reference signal (PRS) from a first wireless node; receiving a second PRS from a second wireless node; receiving, from the first wireless node, an estimate of a first clock error component between the first wireless node and the second wireless node; and estimating a position of the UE based on the first PRS, the second PRS, and the estimate of the first clock error component.

Clause 2: The method of Clause 1, wherein the estimate of the first clock error component is received via an intelligent transportation system (ITS) message.

Clause 3: The method of Clause 1 or 2, wherein estimating the position of the UE comprises: measuring a first time difference of arrival (TDOA) of the first PRS; measuring a second TDOA of the second PRS; estimating a second clock error component between the UE and the first wireless node, based on the estimate of the first clock error component; determining a first distance from the first wireless node based on the first TDOA and the second clock error component; estimating a third clock error component between the UE and the second wireless node, based on the estimate of the first clock error component; determining a second distance from the second wireless node based on the second TDOA and the third clock error component; and determining the position of the UE based on the first distance, the second distance, a position of the first wireless node, and a position of the second wireless node.

Clause 4: The method of any of Clauses 1-3, further comprising: triggering the first wireless node to transmit the estimate of the first clock error component; and wherein receiving, from the first wireless node, the estimate of the first clock error component between the first wireless node and the second wireless node is in accordance with the trigger.

Clause 5: The method of any of Clauses 1-4, wherein at least one of the first wireless node or second wireless node comprises a roadside service unit (RSU).

Clause 6: The method of any of Clauses 1-5, further comprising: receiving multiple PRSs from multiple wireless nodes; receiving, from a master wireless node of the multiple wireless nodes, estimates of a first clock error component between each node pair of the multiple wireless nodes; and estimating a position of the UE based on the multiple PRSs and the estimates of the first clock error component between each node pair.

Clause 7: The method of any of Clauses 1-6, further comprising: receiving multiple PRSs from multiple wireless nodes; receiving, from a wireless node of each node pair of the multiple wireless nodes, an estimate of a first clock error component between the node pair; and estimating a position of the UE based on the multiple PRSs and the estimates of the first clock error component between each node pair.

Clause 8: A method for wireless communications performed by a first wireless node, comprising: transmitting a first positioning reference signal (PRS) at a first time; receiving a second PRS from a second wireless node at a second time; receiving, from the second wireless node, a first message indicating a third time when the second wireless node received the first PRS and a fourth time when the second wireless node transmitted the second PRS; estimating a clock error component between the first wireless node and the second wireless node, using the first time, the second time, the third time, and the fourth time; and transmitting, to a user equipment (UE), a second message indicating the clock error component.

Clause 9: The method of Clause 8, wherein the second message further indicates the first time.

Clause 10: The method of Clause 8 or 9, wherein: the first message comprises an intelligent transportation system (ITS) message; and the second message comprises another ITS message.

Clause 11: The method of any of Clauses 8-10, further comprising: obtaining a trigger from the UE to transmit the clock error component to the UE; and wherein transmitting the second message indicating the clock error component is in accordance with the trigger.

Clause 12: The method of any of Clauses 8-11, wherein at least one of the first wireless node or second wireless node comprises a roadside service unit (RSU).

Clause 13: The method of any of Clauses 8-12, wherein the first wireless node is a master wireless node among multiple wireless nodes.

Clause 14: The method of Clause 13, further comprising: receiving estimates of a clock error component for each node pair of the multiple wireless nodes; and wherein the second message is transmitted to a user equipment (UE) and further indicates estimates of a clock error component for each node pair.

Clause 15: The method of any of Clauses 8-14, wherein when the first wireless node and the second wireless node comprise a node pair among multiple wireless nodes, the second message is transmitted to a master node or to a user equipment (UE), otherwise the second message is transmitted to the UE.

Clause 16: An apparatus for wireless communications performed by a user equipment (UE), comprising: at least one processor; and a memory coupled to the at least one processor, the memory including instructions executable by the at least one processor to cause the apparatus to: receive a first positioning reference signal (PRS) from a first wireless node; receive a second PRS from a second wireless node; receive, from the first wireless node, an estimate of a first clock error component between the first wireless node and the second wireless node; and estimate a position of the apparatus, based on the first PRS, the second PRS, and the estimate of the first clock error component.

Clause 17: The apparatus of Clause 16, wherein the estimate of the first clock error component is received via an intelligent transportation system (ITS) message.

Clause 18: The apparatus of Clause 16 or 17, wherein in order to estimate the position of the apparatus, the memory further includes instructions executable by the at least one processor to cause the apparatus to: measure a first time difference of arrival (TDOA) of the first PRS; measure a second TDOA of the second PRS; estimate a second clock error component between the UE and the first wireless node, based on the estimate of the first clock error component; determine a first distance from the first wireless node based on the first TDOA and the second clock error component; estimate a third clock error component between the UE and the second wireless node, based on the estimate of the first clock error component; determine a second distance from the second wireless node based on the second TDOA and the third clock error component; and determine the position of the UE based on the first distance, the second distance, a position of the first wireless node, and a position of the second wireless node.

Clause 19: The apparatus of any of Clauses 16-18, wherein the memory further includes instructions executable by the at least one processor to cause the apparatus to: trigger the first wireless node to transmit the estimate of the first clock error component; and wherein receiving, from the first wireless node, the estimate of the first clock error component between the first wireless node and the second wireless node is in accordance with the trigger.

Clause 20: The apparatus of any of Clauses 16-19, wherein at least one of the first wireless node or second wireless node comprises a roadside service unit (RSU).

Clause 21: The apparatus of any of Clauses 16-20, wherein the memory further includes instructions executable by the at least one processor to cause the apparatus to: receive multiple PRSs from multiple wireless nodes; receive, from a master wireless node of the multiple wireless nodes, estimates of a first clock error component between each node pair of the multiple wireless nodes; and estimate a position of the UE, based on the multiple PRSs and the estimates of the first clock error component between each node pair.

Clause 22: The apparatus of any of Clauses 16-21, wherein the memory further includes instructions executable by the at least one processor to cause the apparatus to: receive multiple PRSs from multiple wireless nodes; receive, from a wireless node of each node pair of the multiple wireless nodes, an estimate of a first clock error component between the node pair; and estimate a position of the apparatus based on the multiple PRSs and the estimates of the first clock error component between each node pair.

Clause 23: An apparatus for wireless communications performed by a first wireless node, comprising: at least one processor; and a memory coupled to the at least one processor, the memory including instructions executable by the at least one processor to cause the apparatus to: transmit a first positioning reference signal (PRS) at a first time; receive a second PRS from a second wireless node at a second time; receive, from the second wireless node, a first message indicating a third time when the second wireless node received the first PRS and a fourth time when the second wireless node transmitted the second PRS; estimate a clock error component between the apparatus and the second wireless node, using the first time, the second time, the third time, and the fourth time; and transmit, to a user equipment (UE), a second message indicating the clock error component.

Clause 24: The apparatus of Clause 23, wherein the second message further indicates the first time.

Clause 25: The apparatus of Clause 23 or 24, wherein: the first message comprises an intelligent transportation system (ITS) message; and the second message comprises another ITS message.

Clause 26: The apparatus of any of Clauses 23-25, wherein the memory further includes instructions executable by the at least one processor to cause the apparatus to: obtain a trigger from the UE to transmit the clock error component to the UE; and wherein transmitting the second message indicating the clock error component is in accordance with the trigger.

Clause 27: The apparatus of any of Clauses 23-26, wherein at least one of the first wireless node or second wireless node comprises a roadside service unit (RSU).

Clause 28: The apparatus of any of Clauses 23-27, wherein the first wireless node is a master wireless node among multiple wireless nodes.

Clause 29: The apparatus of Clause 28, wherein the memory further includes instructions executable by the at least one processor to cause the apparatus to: receive estimates of a clock error component for each node pair of the multiple wireless nodes; and wherein the second message is transmitted to a user equipment (UE) and further indicates estimates of a clock error component for each node pair.

Clause 30: The apparatus of any of Clauses 23-29, wherein when the first wireless node and the second wireless node comprise a node pair among multiple wireless nodes, the second message is transmitted to a master node or to a user equipment (UE), otherwise the second message is transmitted to the UE.

Clause 31: An apparatus, comprising means for performing a method in accordance with any one of Clauses 1-15.

Clause 32: A non-transitory computer-readable medium comprising executable instructions that, when executed by one or more processors of an apparatus, cause the apparatus to perform a method in accordance with any one of Clauses 1-15.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription.

A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a first wireless node, comprising:
   transmitting a first positioning reference signal (PRS) at a first time;
   receiving a second PRS from a second wireless node at a second time;
   receiving, from the second wireless node, a first message indicating a third time when the second wireless node received the first PRS and a fourth time when the second wireless node transmitted the second PRS;

estimating a clock error component between the first wireless node and the second wireless node, using the first time, the second time, the third time, and the fourth time; and transmitting, to a user equipment (UE), a second message indicating the clock error component.

2. The method of claim 1, wherein the second message further indicates the first time.

3. The method of claim 1, wherein:
the first message comprises an intelligent transportation system (ITS) message; and
the second message comprises another ITS message.

4. The method of claim 1, further comprising:
obtaining a trigger from the UE to transmit the clock error component to the UE; and
wherein transmitting the second message indicating the clock error component is in accordance with the trigger.

5. The method of claim 1, wherein at least one of the first wireless node or the second wireless node comprises a roadside service unit (RSU).

6. The method of claim 1, wherein the first wireless node is a master wireless node among multiple wireless nodes.

7. The method of claim 6, further comprising:
receiving estimates of a clock error component for each node pair of the multiple wireless nodes; and
wherein the second message is transmitted to the UE and further indicates the estimates of the clock error component for each node pair.

8. The method of claim 1, wherein in response to the first wireless node and the second wireless node comprising a node pair among multiple wireless nodes, the second message is transmitted to a master node or to the UE; and in response to the first wireless node and the second wireless node not comprising a node pair among multiple wireless nodes, transmitting the second message to the UE.

9. An apparatus for wireless communications performed by a first wireless node, comprising:
memory;
a transceiver; and
at least one processor, the at least one processor communicatively connected to the memory and the transceiver, the at least one processor configured to:
transmit a first positioning reference signal (PRS) at a first time;
receive a second PRS from a second wireless node at a second time;
receive, from the second wireless node, a first message indicating a third time when the second wireless node received the first PRS and a fourth time when the second wireless node transmitted the second PRS;
estimate a clock error component between the apparatus and the second wireless node, using the first time, the second time, the third time, and the fourth time; and
transmit, to a user equipment (UE), a second message indicating the clock error component.

10. The apparatus of claim 9, wherein the second message further indicates the first time.

11. The apparatus of claim 9, wherein:
the first message comprises an intelligent transportation system (ITS) message; and
the second message comprises another ITS message.

12. The apparatus of claim 9, wherein the at least one processor is further configured to:
obtain a trigger from the UE to transmit the clock error component to the UE; and
wherein transmitting the second message indicating the clock error component is in accordance with the trigger.

13. The apparatus of claim 9, wherein at least one of the first wireless node or the second wireless node comprises a roadside service unit (RSU).

14. The apparatus of claim 9, wherein the first wireless node is a master wireless node among multiple wireless nodes.

15. The apparatus of claim 14, wherein the at least one processor is further configured to cause the apparatus to:
receive estimates of a clock error component for each node pair of the multiple wireless nodes; and
wherein the second message is transmitted to the UE and further indicates the estimates of the clock error component for each node pair.

16. The apparatus of claim 9, wherein in response to the first wireless node and the second wireless node comprising a node pair among multiple wireless nodes, the second message is transmitted to a master node or to the UE; and in response to the first wireless node and the second wireless node not comprising a node pair among multiple wireless nodes, transmitting the second message to the UE.

* * * * *